W. KANTER.
ANIMAL TRAP.
APPLICATION FILED APR. 20, 1912.

1,048,318.

Patented Dec. 24, 1912.

INVENTOR
William Kanter.
By Fisher & Moset Attys.

ATTEST

UNITED STATES PATENT OFFICE.

WILLIAM KANTER, OF CLEVELAND, OHIO.

ANIMAL-TRAP.

1,048,318.  Specification of Letters Patent.  Patented Dec. 24, 1912.

Application filed April 20, 1912. Serial No. 692,063.

*To all whom it may concern:*

Be it known that I, WILLIAM KANTER, a citizen of the United States, residing at Cleveland, in the county of Cuyahoga and State of Ohio, have invented certain new and useful Improvements in Animal-Traps, of which the following is a specification.

This invention relates to animal traps but is especially designed for catching mice and rats. It serves, however, equally well for catching larger animals alive, such as rabbits, ground-hogs, muskrats and the like, if the trap be made of the requisite size and strength.

Figure 1:
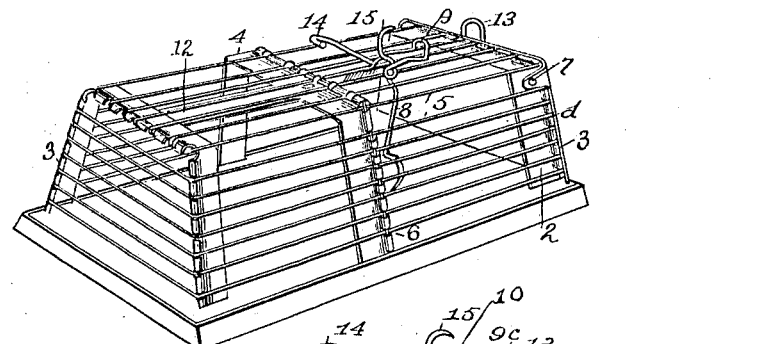
Figure 2:
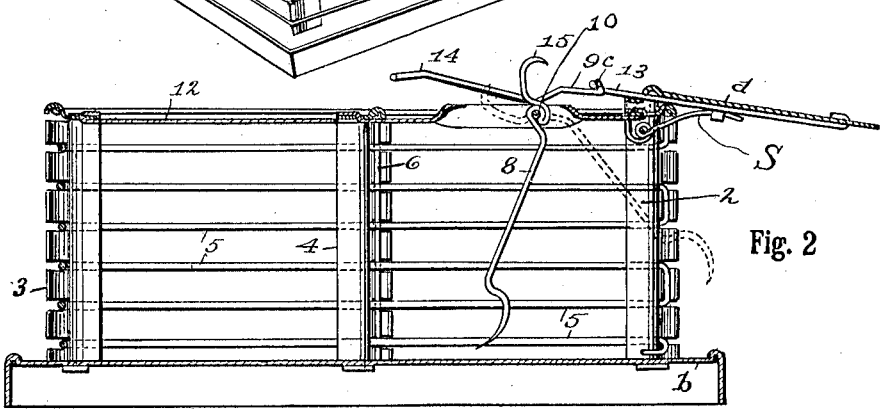
Figure 3:
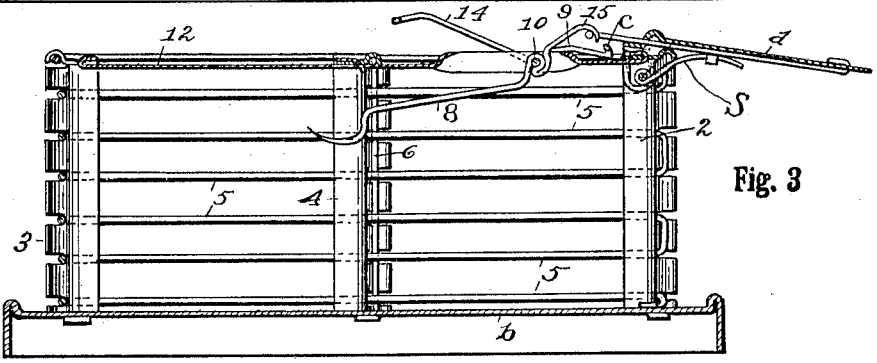
Figure 4:
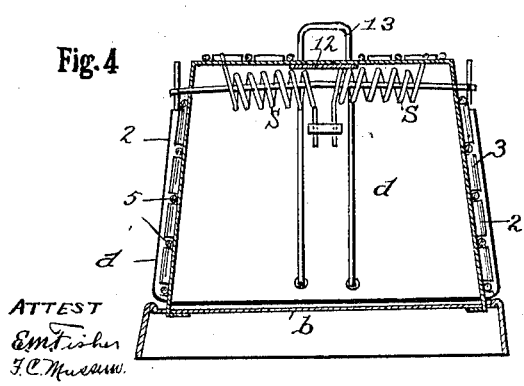
Figure 5:
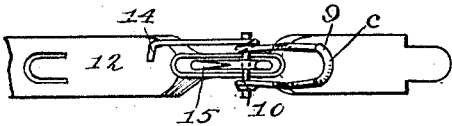

In the accompanying drawings Figure 1 is a perspective view of the trap complete. Fig. 2 is a longitudinal sectional elevation showing the trap in its initial opened position, the door being swung open and held by a temporary catch. Fig. 3 shows the door open but released from the temporary catch and held by the trigger of the baiting stem. Fig. 4 is an inside view of the door and its opening, and Fig. 5 is a plan view of the portion of the trap on which the temporary catch and the baiting wire are engaged and showing their relation to each other.

As thus shown the trap has a suitable frame with end members 2 made of suitable sheet metal bent and struck up to the desired shape and fixed in the metallic base $b$. The said end members are struck up with curved lip like projections 3 at their outer edges with open slots between and there may be one or more similarly constructed reinforcing supports 4 between the ends of the trap.

The wire 5 which constitutes the mesh of the trap is a continuous strand for sides, top and rear end, and is wound from the base upward and at last back and forth in the top of the trap about the lips 3. The said lips are struck outward from the plain surface of the said frame supports and also curved inward at their edges, being semi-circular in cross section, and in the case of the middle support 4 a wire 6 is shown as threaded through said lips outside of the wire 5 and so as to confine the same. The wires 5 are drawn tightly about the ends of the frame so that they require no other fastening than is obtained by or in the slots between the lips 3 and at the front the wire 5 is wound back about the said lips and this leaves the front of the trap open.

The door $d$ is provided with ears at its top through which it is hinged at 7 on the front support 2 and adapted to swing into full open position as seen in Figs. 2 and 3.

Now, one of the important improvements in this trap as compared with others familiar to me is the means for temporarily holding the door open while baiting the finger or wire 8. This style of trap is comparatively narrow and deep lengthwise and it would be practically impossible to apply the bait if the said finger could not be drawn forward near to the door. Hence, also, I employ a catch 9 to hold the door open while I am applying the bait, and both said parts are shown as made of suitable wire bent to shape and hung on a cross wire or pin 10 in the special metal bracing strip 12, which connects the three supports 2 and 4 centrally at their top. This strip is rigid and really constitutes a portion of the complete frame and is affixed by struck up or other portions engaged in said supports and has a longitudinal slot with the sides of the strip turned edgewise to pass the wire or pivot pin 10 through the same. The catch 9 has a lip $c$ which is engaged by a loop 13 on the door when the door is open for baiting, and a rearward projecting extension or arm 14 of the catch 9 is depressed to raise the catch into engaging position with said loop, but when the door is raised slightly farther to engage the bait trigger 15 therewith the catch 9 drops by gravity and the door is held as in Fig. 3. The trap is now set. The trigger 15 is a portion of the baiting wire in this instance and is secured by a wind about the pivot 10. A suitable spring $s$ or its equivalent serves to hold the door closed.

It is to be especially observed that normally the bait stem hangs suspended but is adapted to be swung forward into the front opening of the trap to affix the bait thereto, as seen in dotted lines Fig. 2. This is a very great convenience to the user of the trap and of the very essence of the present invention.

What I claim is:—

An animal trap having a door pivoted at its top on the frame of the trap and provided with a loop at its top and center, in combination with a transverse pivot in the top and front of the trap, a catch to hold the said door temporarily open swung on said pivot and a baiting stem suspended on said pivot and provided with a trigger extension adapted to engage said door.

In testimony whereof I affix my signature in presence of two witnesses.

WILLIAM KANTER.

Witnesses:
E. M. FISHER,
F. C. MUSSUN.

Copies of this patent may be obtained for five cents each, by addressing the "Commissioner of Patents, Washington, D. C."